(No Model.)

H. I. BLOCK.
CULINARY GRATER.

No. 402,651. Patented May 7, 1889.

Witnesses.

Inventor.
Hyman I. Block
By Jno. G. Elliott,
atty.

UNITED STATES PATENT OFFICE.

HYMAN I. BLOCK, OF CHICAGO, ASSIGNOR OF ONE-THIRD TO HYMAN LEBOWICH, OF COOK COUNTY, ILLINOIS.

CULINARY GRATER.

SPECIFICATION forming part of Letters Patent No. 402,651, dated May 7, 1889.

Application filed April 28, 1888. Serial No. 272,145. (No model.)

*To all whom it may concern:*

Be it known that I, HYMAN I. BLOCK, a subject of the Emperor of Russia, and a resident of Chicago, in the county of Cook and State of Illinois, have invented certain new and useful Improvements in Graters, of which the following is a specification.

This invention relates to improvements in culinary graters, and has for its prime object to produce from sheet metal a grater having a handle both ends of which are integral with the body of the grater.

Another object is to produce from sheet metal a culinary grater having integral therewith a handle extending transversely the body of the grater.

A further object is to produce from sheet metal a culinary grater having continuous walls or sides with opposing seams and a handle integral therewith at a point between said seams, whereby the walls of said grater are braced laterally and longitudinally at four different points.

A still further object is to produce a culinary grater from a single sheet of metal, the body of which has continuous or unbroken walls and the handle of which is integral at both its ends with said body. I attain these objects by the devices illustrated in the accompanying drawings, in which—

Figure 1:
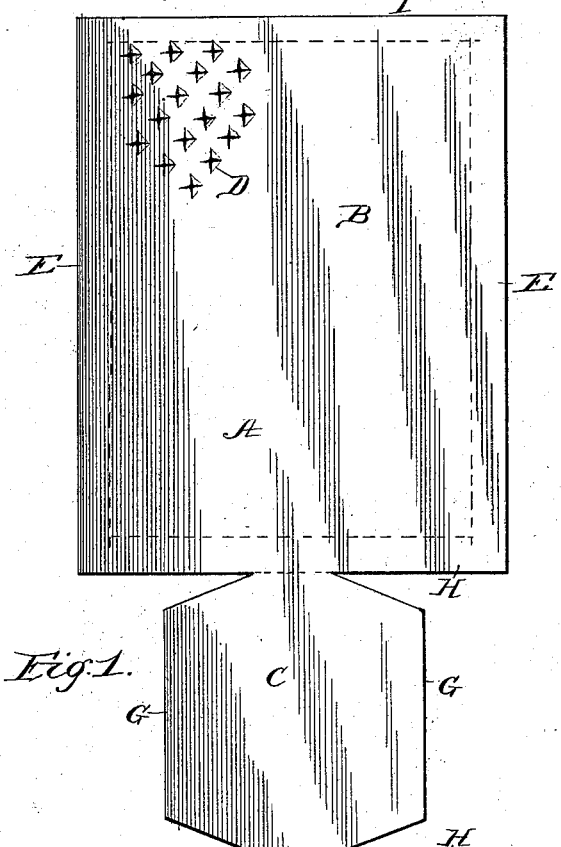
Figure 2:
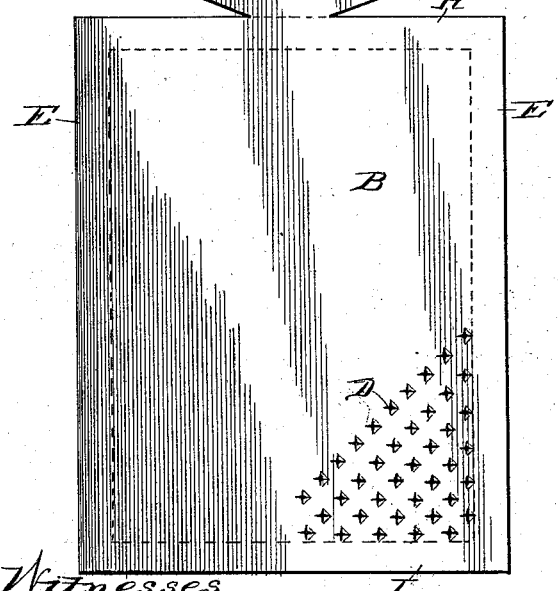
Figure 2:
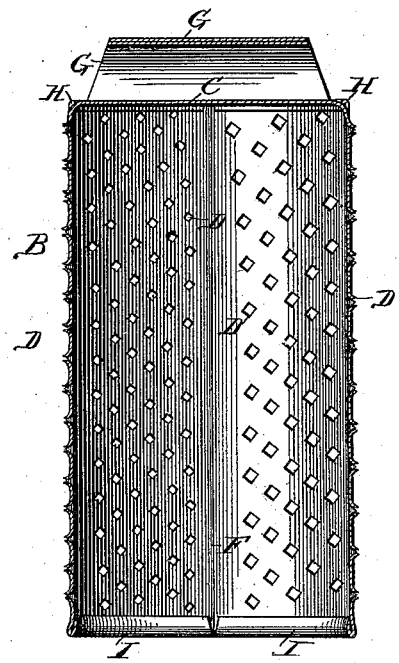

Figure 1 represents a plan view of the preferred form of sheet-metal blank from which the grater is formed; Fig. 2, a central vertical section of a completed grater on line 2 2 of Fig. 3, and Fig. 3 a plan view of the completed grater.

Similar letters of reference indicate the same parts in the several figures of the drawings.

Referring by letter to the accompanying drawings, A indicates a blank composed of a rectangular sheet of metal of any desired length, according to the size of grater which it is desired to produce. This blank is cut away toward the center thereof and inwardly from the side edges, as shown in Fig. 1, so as to leave two end portions, B, rectangular in shape and connected longitudinally at the center thereof by a narrow strip of metal, C, left by the cuts in the side edges of said blanks. The ends B B of the blank are then perforated in any well-known and convenient manner throughout the body thereof, as shown at D, the perforations in one of the ends being, preferably, larger than those in the other in order to make a different-sized grating-surface. These ends are then formed over a mandrel longitudinally of the entire blank into semicircles and then bent toward each other and at right angles to the central strip, C, until the opposing edges E thereof overlap each other, after which these edges are united by a seam, F, in the usual manner, so as to firmly unite the two parts together, and thereby form a body for the grater having continuous walls. One end of the grater is of course open; but the opposite end is spanned by the strip C, integrally united to the two halves of the body between the seams thereof, from which project laterally flaps G on each side thereof, left in the transverse cutting of the blank, which flaps, after the body is united, may be bent, curved, or rolled up toward each other, as shown, so as to form a substantially-cylindrical handle, G, by which the grater is held. The opposing edges of these flaps, however, may be united in the same manner as the opposing edges of the ends B—that is, by a seam—so as to strengthen the same, and, if desired, the handle, instead of projecting straight across between the two sections of the body, may be arched or curved slightly outward therefrom, so as to afford a better grip for the hand and one more easy to be grasped, as the fingers in that case would not have to project inside of the grater-body.

Figure 3:
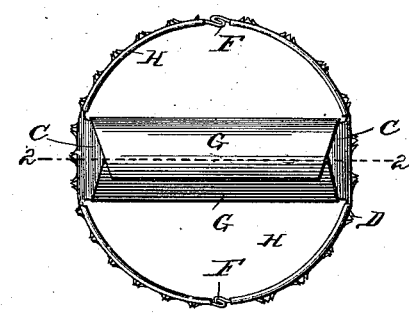

In practice the upper and lower edges, H I, respectively, of the ends B B would be rolled or ribbed, as shown in Figs. 2 and 3, in order to dispense with the sharp edge of the metal, which would be apt to cut the hands of the operator and at the same time strengthen the body of the grater against collapsing, in which they are materially aided by the handle projecting laterally across and uniting the two halves thereof in such manner that greater force than such articles are ever subjected to in the ordinary use thereof will have to be employed in order to flatten or bend the body, while the seams F in the body so stiffen the same longitudinally that bending thereof in that direction by ordinary usage is out of the question.

While I have shown and described the body of the grater as cylindrical, I do not desire to limit myself to that particular form, for obviously the body of the grater might be square, triangular, or polygonal in cross-section without departing from the spirit of my invention, which consists, essentially, of a culinary grater the walls of the body of which are continuous, and which is provided with a handle connected integrally at both its ends to said body.

In conclusion, I may state that, instead of cutting away from the blank any metal at all, the ends may be formed by transverse slits extending a suitable distance toward the center of the blank, leaving all of the metal originally in the rectangular blank attached to the center connecting-strip, C, which is to form the handle; but in practice I prefer to cut away a portion of this metal attached to this strip, because the handle may then be given a more finished appearance and made of a proper size without the necessity of rolling the metal upon itself or otherwise disposing of it.

Having described my invention, what I claim, and desire to secure by Letters Patent, is—

1. The herein-described grater made from a blank composed of two perforated rectangular portions connected by an intermediate strip of metal, the rectangular portions being bent to the desired form and united at the edges to form the body of the grater and the intermediate strip being bent to form the handle of the grater, substantially as described.

2. The herein-described grater made from a blank composed of two perforated portions connected by an intermediate strip of metal, the rectangular portions being bent to the desired form and united at the edges to form the body of the grater, the intermediate strip being bent to the desired form to form the handle of the grater, said handle joining the walls of the grater at a point between its uniting-seams, substantially as described.

HYMAN I. BLOCK.

Witnesses:
WILL R. OMOHUNDRO,
ALBERT M. BENNETT.